United States Patent
Liu et al.

(10) Patent No.: US 7,638,956 B2
(45) Date of Patent: Dec. 29, 2009

(54) METHOD OF CALIBRATING MONOCHROMATIC LIGHT BEAMS OUTPUTTED BY LIGHT EMITTING DIODES AND RELATED LIGHT EMITTING DIODE CONTROL SYSTEM

(75) Inventors: Ming-Dah Liu, Hsinchu (TW); Yu-Chuan Wen, Hsinchu (TW); Chia-Hung Hsu, Hsinchu (TW)

(73) Assignee: Coretronic Corporation, Hsinchu (TW)

( * ) Notice: Subject to any disclaimer, the term of this patent is extended or adjusted under 35 U.S.C. 154(b) by 387 days.

(21) Appl. No.: 11/775,236

(22) Filed: Jul. 10, 2007

(65) Prior Publication Data

US 2008/0068597 A1    Mar. 20, 2008

(30) Foreign Application Priority Data

Sep. 15, 2006 (TW) .............................. 95134309 A (51) Int. Cl.
*G05F 1/00* (2006.01)
(52) U.S. Cl. .................... 315/308; 315/307; 315/149; 315/312; 356/228; 356/229; 356/222
(58) Field of Classification Search .............. 315/149, 315/150, 159, 291, 224, 307, 308, 312; 345/77, 345/82, 83, 102; 356/222, 226, 228, 229, 356/221
See application file for complete search history.

(56) References Cited

U.S. PATENT DOCUMENTS

| | | | |
|---|---|---|---|
| 6,411,046 B1 | 6/2002 | Muthu | |
| 6,507,159 B2 | 1/2003 | Muthu | |
| 6,596,977 B2 | 7/2003 | Muthu | |
| 6,630,801 B2 | 10/2003 | Schuurmans | |
| 7,388,665 B2 * | 6/2008 | Ashdown | 356/419 |
| 7,560,677 B2 * | 7/2009 | Lyons et al. | 250/205 |

* cited by examiner

*Primary Examiner*—Haissa Philogene
(74) *Attorney, Agent, or Firm*—Winston Hsu (57) ABSTRACT

To control chroma and brightness in a backlight module, a plurality of reference values of a plurality of monochromatic light beams are provided, and a brightness reference value is provided for the light formed of the monochromatic light beams. Then, a plurality of first light signals of the monochromatic light beams, and a second light signal of the light formed of the monochromatic light beams are sensed and compared with the reference values and the brightness reference value, respectively. Finally, the monochromatic light beams outputted by the plurality of LEDs is calibrated according to a comparison result of the plurality of first light signals with the plurality of reference values and a comparison result of the second light signal with the brightness reference value.

16 Claims, 5 Drawing Sheets

METHOD OF CALIBRATING MONOCHROMATIC LIGHT BEAMS OUTPUTTED BY LIGHT EMITTING DIODES AND RELATED LIGHT EMITTING DIODE CONTROL SYSTEM

BACKGROUND OF THE INVENTION

1. Field of the Invention

The present invention relates to light-emitting diode (LED) control systems and methods, and more particularly to an LED control system that calibrates monochromatic LEDs according to monochromatic light beam feedback of the monochromatic LEDs.

2. Description of the Prior Art

At present, video displays incorporate light-emitting diodes (LED) as a light source of a backlight module. Using LEDs as the light source of the backlight module creates a problem of color shift, or deviation from white color. Color shift in the LEDs of the backlight module causes color shift in the video display. The problem with color shift is caused by difficulty in controlling the quality of the color range of light emitted by each LED to be at the same level. Perception of color by the human eye is an intricate process. In order to quantify the description of color, Commission Internationale de l'Eclairage (CIE, International Commission on Illumination) performed vision experiments to record the visual sensation of the eye of observers brought about by lights with different wavelengths, and deduced the CIE 1931 Color Matching Function for the colors red, green, and blue. According to this Color Matching Function, colors are quantified by chromaticity coordinates. Colors in a display are also expressed through chromaticity coordinates. As the human eye increasingly demands higher color quality, backlight modules with high luminescence and color quality are needed for use in displays.

For example, if LEDs of the three fundamental colors (RGB) are utilized as a light source of a backlight module, the brightness of the light outputted by LEDs changes with changes in temperature or prolonged periods of use. The change in brightness is not exactly the same for each LED with different color, such that the overall brightness of the light source is unstable, and the color coordinates thereof undergo a shift. To improve on this condition, U.S. Pat. Nos. 6,630,801, 6,894,442, 6,441,558, 6,127,783, 6,495,964, 6,510,995, 6,753,661, 6,552,495, 6,992,803, and 6,998,594 disclose utilization of a result of sensing the fundamental RGB light outputs of the RGB LEDs to perform closed feedback control to correct the problem of the unstable LED light source. Only the three fundamental color RGB sensor signals act as a feedback signal. There is no way to use the brightness of the light formed by the combination of the lights of the three fundamental colors RGB directly as the feedback signal. Namely, it is not possible to obtain the brightness value of the light outputted by the backlight module directly in the prior art. Instead, the brightness value of the outputted light of the backlight module must be calculated from the respective brightness values of light of the three fundamental colors RGB. Accordingly, the calibration method of the prior art cannot directly perform feedback control on the light source outputted by the backlight module, and thus cannot truly improve on the instability of the LED light source.

SUMMARY OF THE INVENTION

According to the present invention, a method of calibrating a plurality of monochromatic light beams outputted by a plurality of light emitting diodes (LED) comprises providing a plurality of reference values of the plurality of monochromatic light beams, providing a brightness reference value of a light formed of the plurality of monochromatic light beams, sensing a plurality of first light signals of the plurality of monochromatic light beams outputted by the plurality of LEDs, sensing a second light signal of the light formed of the plurality of monochromatic light beams, comparing the plurality of first light signals of the plurality of monochromatic light beams with the plurality of reference values of the plurality of monochromatic light beams, comparing the second light signal of the light formed of the plurality of monochromatic light beams with the brightness reference value of the light formed of the plurality of monochromatic light beams, and calibrating the plurality of monochromatic light beams outputted by the plurality of LEDs according to a result of comparing the plurality of first light signals with the plurality of reference values and a result of comparing the second light signal with the brightness reference value.

According to the present invention, an LED control system for calibrating a plurality of monochromatic light beams outputted by a plurality of LEDs comprises a reference value generating device for generating reference values of the plurality of monochromatic light beams and a brightness reference value of a light formed of the plurality of monochromatic light beams, a light sensing module for sensing first light signals of the plurality of monochromatic light beams outputted by the plurality of LEDs, and for sensing a second light signal of the light formed of the plurality of monochromatic light beams, a chroma comparison device coupled to the reference value generating device and the light sensing module for comparing the reference values of the plurality of monochromatic light beams generated by the reference value generating device and the first light signals of the plurality of monochromatic light beams sensed by the light sensing module, a brightness comparison device coupled to the reference value generating device and the light sensing module for comparing the brightness reference value of the light formed of the plurality of monochromatic light beams generated by the reference value generating device and the second light signal of the light formed of the plurality of monochromatic light beams sensed by the light sensing module, and a control device coupled to the chroma comparison device and the brightness comparison device for calibrating the plurality of monochromatic light beams outputted by the plurality of LEDs according to a comparison result outputted by the chroma comparison device and a comparison result outputted by the brightness comparison device.

Other objectives, features and advantages of the present invention will be further understood from the further technology features disclosed by the embodiments of the present invention wherein there are shown and described preferred embodiments of this invention, simply by way of illustration of modes best suited to carry out the invention.

DETAILED DESCRIPTION

It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and "coupled," and variations thereof herein are used broadly and encompass direct and indirect connections, couplings, and mountings.

Figure 1:
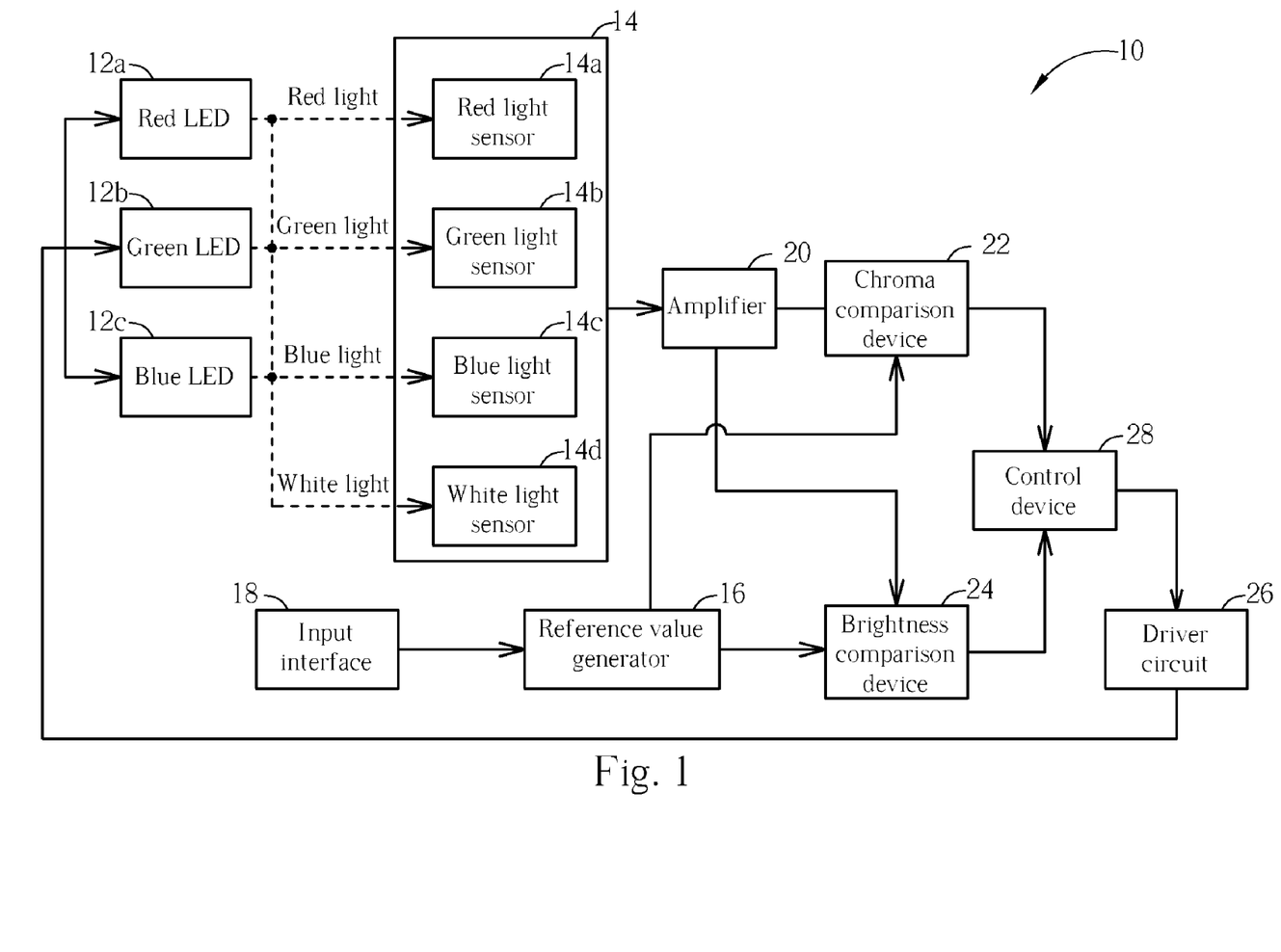
FIG. 1 is a function block diagram of an LED control system according to an embodiment of the present invention.

Please refer to FIG. 1, which is a functional block diagram of a light emitting diode (LED) control system 10 according to an embodiment of the present invention. The LED control system 10 is used for calibrating red light, green light, and blue light outputted by a red LED 12a, a green LED 12b, and a blue LED 12c, respectively. The red light, green light, and blue light combine to form white light for use as a light source in a backlight module.

The LED control system 10 comprises a light sensing module 14, a reference value generating device 16, an input interface 18, an amplifier 20, a chroma comparison device 22, a brightness comparison device 24, a driver circuit 26, and a control device 28. The light sensing module 14 comprises a red light sensing unit 14a, a green light sensing unit 14b, and a blue light sensing unit 14c utilized for sensing brightness or intensity of red, green, and blue light signals of the red LED 12a, the green LED 12b, and the blue LED 12c, respectively. The light sensing module 14 further comprises a white light sensing unit 14d utilized for sensing brightness or intensity of a white light signal formed of a combination of the red light, green light, and blue light. The light sensing module 14 is a TAOS TCS240 color sensor module combined with three fundamental color filters, which simultaneously senses the brightness or intensity of red light, green light, blue light, and unfiltered light (white light formed of the red light, green light, and blue light) signals. Further, the red light sensing unit 14a, the green light sensing unit 14b, the blue light sensing unit 14c, and the white light sensing unit 14d are installed on the same circuit board adjacent to the red LED 12a, the green LED 12b, and the blue LED 12c, such that circuits of the light sensing module 14 are placed together with circuits of the LEDs.

The reference value generating device 16 is used to generate reference values for the red light, the green light, and the blue light, as well as a brightness reference value for the white light formed of the red light, the green light, and the blue light.

The input interface 18 is coupled to the reference value generating device 16, and is utilized for providing a user a method of inputting a brightness value, color coordinates, and a color temperature. For example, the user uses the input interface 18 to input a CIE 1931 color parameter, such as color coordinates or a color temperature, after which the reference value generating device 16 generates a ratio of red light brightness to green light brightness and a ratio of blue light brightness to green light brightness, i.e. the ratio of any two of the three fundamental colors, according to the color parameter, such as color coordinates or color temperature, transmitted by the input interface 18, which ratio acts as a reference value. Or, the user directly inputs red, green, and blue brightness values through the input interface 18, after which the reference value generating device 16 generates a ratio of red light brightness to green light brightness and a ratio of blue light brightness to green light brightness, i.e. the ratio of any two of the three fundamental colors, according to the color brightness values transmitted by the input interface 18, which ratio acts as a reference value. In addition, the user inputs a white light brightness value through the input interface 18, after which the reference value generating device 16 generates a white light brightness reference value according to the brightness value transmitted by the input interface 18.

The amplifier 20 is coupled to the light sensing module 14 for amplifying the red light, green light, and blue light signals outputted by the red LED 12a, the green LED 12b, and the blue LED 12c, and sensed by the red light sensing unit 14a, the green light sensing unit 14b, and for amplifying the white light signal sensed by the white light sensing unit 14d.

The chroma comparison device 22 is coupled to the reference value generating device 16 and the amplifier 20 for comparing the red light, green light, and blue light reference values generated by the reference value generating device 16 and the red light, green light, and blue light signals amplified and transmitted by the amplifier 20.

The brightness comparison device 24 is coupled to the reference value generating device 16 and the amplifier 20 for comparing the white light brightness reference value generated by the reference value generating device 16 and the white light signal amplified and transmitted by the amplifier 20.

The driver circuit 26 is coupled to the red LED 12a, the green LED 12b, and the blue LED 12c for driving the red LED 12a, the green LED 12b, and the blue LED 12c to output red light, green light, and blue light, respectively.

The control device 28 is coupled to the chroma comparison device 22, the brightness comparison device 24, and the driver circuit 26 for controlling a current or voltage used by the driver circuit 26 to drive the red LED 12a, the green LED 12b, and the blue LED 12c according to comparison results of the chroma comparison device 22 and the brightness comparison device 24.

Figure 2:
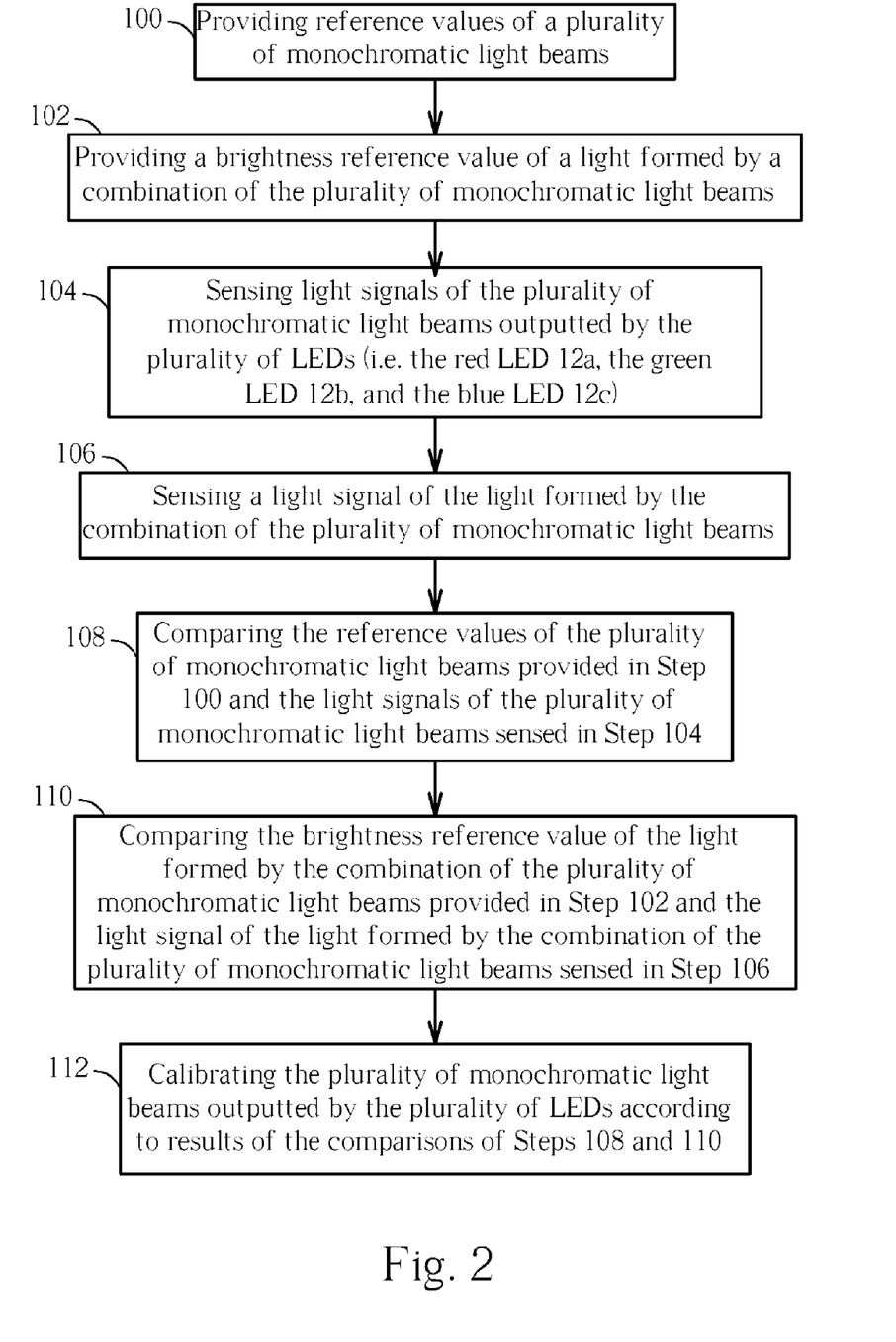
FIG. 2 is a flowchart of a method of calibrating red light, green light, and blue light outputted by a red LED, a green LED, and a blue LED according to an embodiment of the present invention.

Please refer to FIG. 2, which is a flow chart diagram of a method of calibrating the red light, green light, and blue light outputted by the red LED 12a, the green LED 12b, and the blue LED 12c in the LED control system 10 according an embodiment of the present invention. The method comprises the following steps:

Step 100: Providing reference values of a plurality of monochromatic light beams.

Step 102: Providing a brightness reference value of a light formed by a combination of the plurality of monochromatic light beams.

Step 104: Sensing light signals of the plurality of monochromatic light beams outputted by the plurality of LEDs (i.e. the red LED 12a, the green LED 12b, and the blue LED 12c).

Step 106: Sensing a light signal of the light formed by the combination of the plurality of monochromatic light beams.

Step 108: Comparing the reference values of the plurality of monochromatic light beams provided in Step 100 and the light signals of the plurality of monochromatic light beams sensed in Step 104.

Step 110: Comparing the brightness reference value of the light formed by the combination of the plurality of monochromatic light beams provided in Step 102 and the light signal of the light formed by the combination of the plurality of monochromatic light beams sensed in Step 106.

Step 112: Calibrating the plurality of monochromatic light beams outputted by the plurality of LEDs according to results of the comparisons of Steps 108 and 110.

The following is a description of the above-mentioned steps. In Step 100, the reference values of the plurality of monochromatic light beams are provided, and in Step 102, the brightness reference value of the light formed by the combination of the plurality of monochromatic light beams is provided. First, the user uses the input interface 18 to input brightness values, color coordinates, or color temperature values, and uses the reference value generating device 16 to generate corresponding reference values of the red light, the green light, the blue light, and the white light. For example, the user utilizes the input interface 18 to input color parameters, such as CIE 1931 color coordinate XY values or color temperature, as a reference value of a normal color (before color shift), and the reference value generating device 16 calculates a normal ratio of the three fundamental colors according to the color coordinates transmitted by the input interface. For example, when the input is color coordinate XY values, red light brightness, green light brightness, and blue light brightness are obtained by the following chromatics formula:

$$\begin{pmatrix} X_{white} \\ Y_{white} \\ Z_{white} \end{pmatrix} = \begin{pmatrix} \frac{x_R}{y_R} & \frac{x_G}{y_G} & \frac{x_B}{y_B} \\ 1 & 1 & 1 \\ \frac{1-x_R-y_R}{y_R} & \frac{1-x_G-y_G}{y_G} & \frac{1-x_B-y_B}{y_B} \end{pmatrix} \cdot \begin{pmatrix} Y_R \\ Y_G \\ Y_B \end{pmatrix}$$

When the color temperature value is inputted, a Planckian locus black body radiation curve is used to find the corresponding chroma value, and the above chromatics formula is used to find the red light brightness, the green light brightness, and the blue light brightness. Because the human eye is most sensitive to green light, the green light is taken as a reference value for calculating the ratio of red light brightness to green light brightness and the ratio of blue light brightness to green light brightness. Of course, the blue light or the red light is also taken as a reference value for calculating the ratios with the other two fundamental color lights. The ratios obtained are then standard brightness ratios for the red light, the green light, and the blue light under standard color (no color shift) conditions, and act as reference values of the red light, the green light, and the blue light. The user also directly inputs red light, green light, and blue light brightness values through the input interface 18. The ratio of these brightness values is a standard brightness ratio under the condition of standard color (no color shift). On the basis of the brightness values sent from the input interface 18, the reference value generating device 16 also generates the standard ratio of the three colored lights for use as a reference value. Further, the user may input a standard brightness value for white light through the input interface 18, after which on the basis of the standard brightness value sent through the input interface 18, the reference value generating device 16 generates the white light brightness reference value.

In Step 104, the light signals of the plurality of monochromatic light beams outputted by the plurality of LEDs are sensed. The red light sensing unit 14a, the green light sensing unit 14b, and the blue sensing unit 14c sense the brightness or intensity of the red light, green light, and blue light outputted by the red LED 12a, the green LED 12b, and the blue LED 12c, respectively. The white light sensing unit 14d senses the brightness or intensity of the white light formed of the red light, the green light, and the blue light. The amplifier 20 amplifies the light signals of the red light, the green light, the blue light, and the white light formed of the red light, the green light, and the blue light sensed by the red light sensing unit 14a, the green light sensing unit 14b, the blue light sensing unit 14c, and the white light sensing unit 14d, respectively.

In Step 108, the reference values of the plurality of monochromatic light beams provided in Step 100 are compared with the light signals of the plurality of monochromatic beams sensed in Step 104. In Step 110, the brightness reference value of the combined light formed of the plurality of monochromatic light beams provided in Step 102 is compared with the light signal of the combined light formed of the plurality of monochromatic light beams sensed in Step 106. The chroma comparison device 22 compares the reference values of the red light, the green light, and the blue light sent by the reference generating device 16 with the amplified light signals of the red light, green light, and blue light sent by the amplifier 20. For example, on the basis of the amplified light signals of the red light, green light, and blue light sent from the amplifier 20, the chroma comparison device 22 calculates the ratio of the red light brightness to the green light brightness, and the ratio of the blue light brightness to the green light brightness, outputted by the red LED 12a, the green LED 12b, and the blue LED 12c. Then, the chroma comparison device 22 performs comparison of the above-mentioned ratios with the reference values of the ratio of the red light brightness to the green light brightness and the ratio of the blue light brightness to the green light brightness sent by the reference generating device 16. Finally, the chroma comparison device 22 transmits a result of the comparisons to the control device 28. The control device 28 performs closed-loop control according to a proportional-integral-derivative (PID) control method, such as:

$$u(t) = K_p \left( e(t) + T_d \frac{de(t)}{dt} + \frac{1}{T_i} \int e(t)dt \right)$$

where e(t) is an error signal, $K_p$ is a proportional gain constant, $T_i$ is an integrated time constant, and $T_d$ is a derivative time constant. Then, a gain value of a ratio of the red light brightness to the green light brightness ($G_{R/G}$) is adjusted, and a gain value of a ratio of the blue light brightness to the green light brightness ($G_{B/G}$) is adjusted, such that, after adjustment, the ratio of the red light brightness to the green light brightness and the ratio of the blue light brightness to the green light brightness are the same as the reference value. Therefore, the goal of chroma calibration is accomplished. Analogously, the brightness comparison device 24 also compares the white light brightness reference value transmitted by the reference value generating device 16 with the amplified white light brightness signal transmitted by the amplifier 20, and transmits a comparison result thereof to the control device 28. The control device 28 uses the above-mentioned PID control method to perform closed-loop control, and then adjusts a brightness gain (GI) of the red light, the green light, and the blue light, respectively, such that, adjusted the brightness value of the combined light formed of the red light, the green light, and the blue light is the same as the brightness reference value, thereby achieving the goal of brightness calibration.

In Step 112, the plurality of monochromatic light beams outputted by the plurality of LEDs is adjusted according to the comparison results of Steps 108 and 110. The control device 28 inputs a driver signal to the driver circuit 26 according to a result of the above-mentioned adjustment, thereby controlling the current or voltage used by the driver circuit 26 to drive the red LED 12a, the green LED 12b, and the blue LED 12c. For example, the voltages of the red LED 12a, the green LED 12b, and the blue LED 12c can be calibrated, respectively, as:

(Calibrated Drive Voltage/Current for Red LED 12a)=
(Original Drive Voltage/Current for Red LED
12a)*($G_I$)*($G_{R/G}$);

(Calibrated Drive Voltage/Current for Blue LED 12c)
=(Original Drive Voltage/Current for Blue LED
12c)*($G_I$)*($G_{B/G}$);

(Calibrated Drive Voltage/Current for Green LED
12b)=(Original Drive Voltage/Current for Green
LED 12b)*($GI$);

Then, the driver circuit 26 drives the red LED 12a, the green LED 12b, and the blue LED 12c to output red light, green light, and blue light according to the respective calibrated drive voltages/currents for the red LED 12a, the green LED 12b, and the blue LED 12c, thereby achieving the goal of calibrating the brightness and chroma of the red light, the green light, and the blue light outputted by the red LED 12a, the green LED 12b, and the blue LED 12c. Further, the sensing module 14 continues to sense the red light, the green light, and the blue light emitted by the red LED 12a, the green LED 12b, and the blue LED 12c to form a closed-loop control system.

Figure 3:
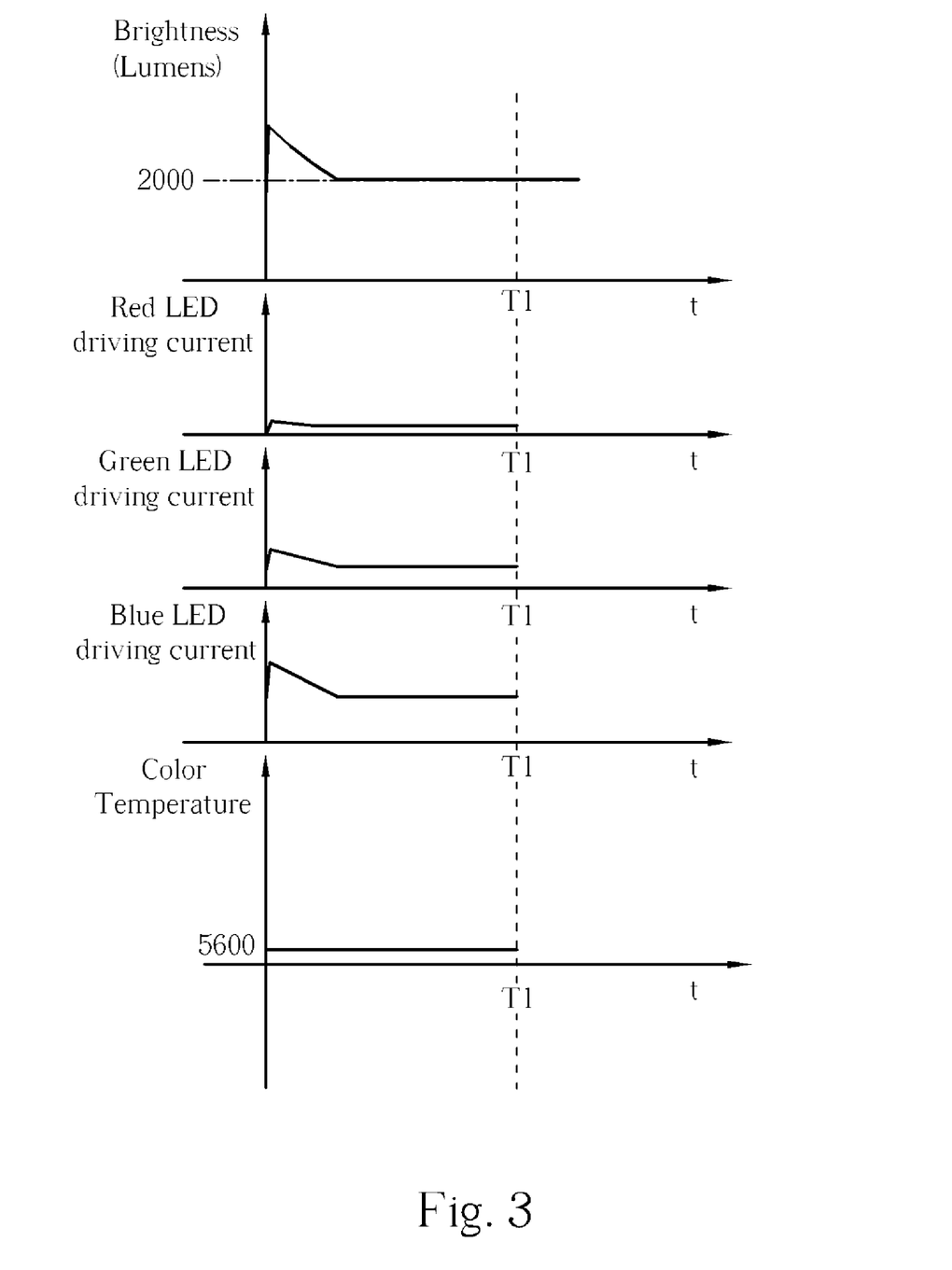
FIG. 3 is a diagram of brightness calibration, current calibration, and color temperature change after a first time inputting a reference value in the LED control system according to an embodiment of the present invention.
Figure 4:
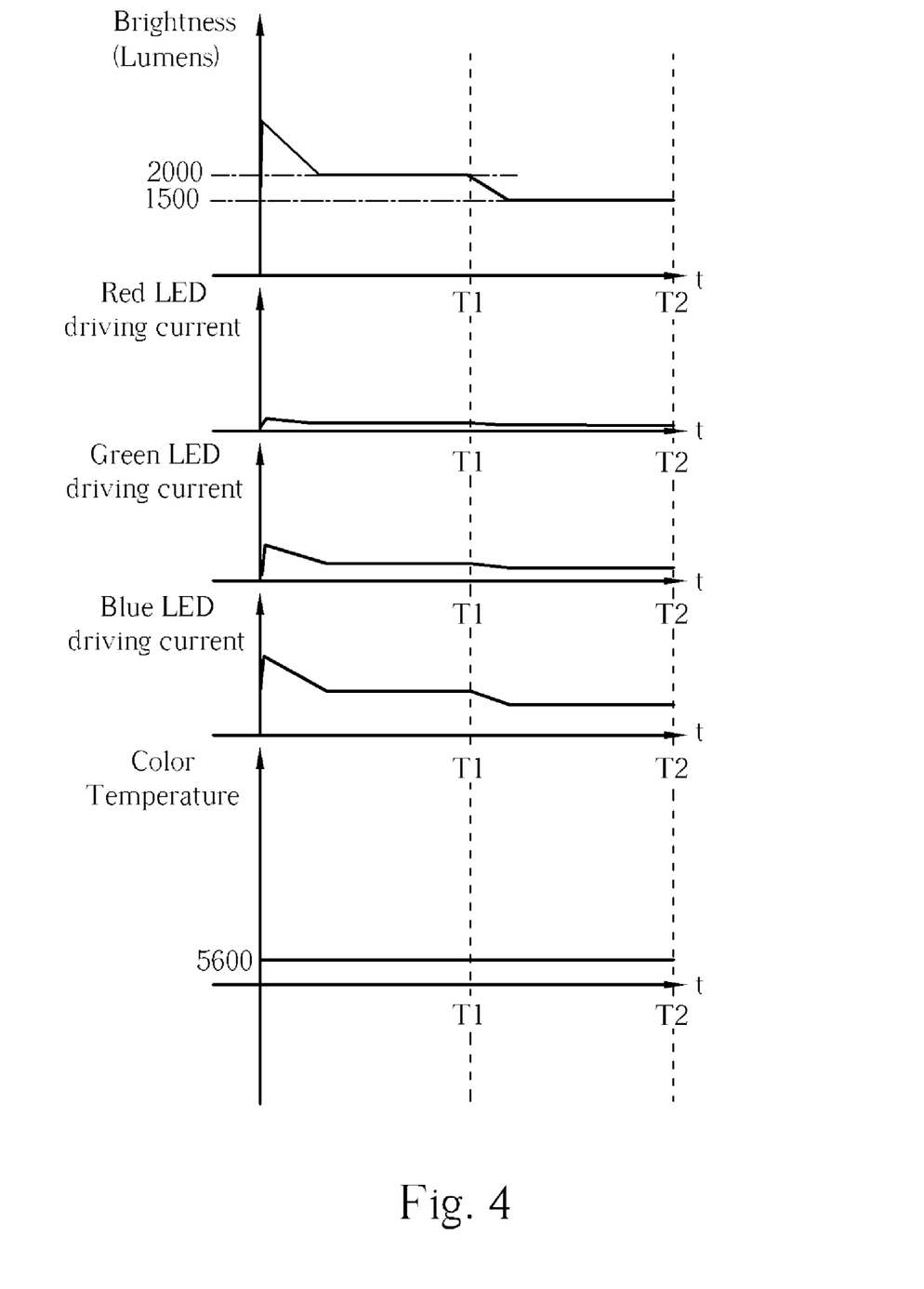
FIG. 4 is a diagram of brightness calibration, current calibration, and color temperature change after a second time inputting a reference value in the LED control system according to an embodiment of the present invention.

The following is an example to describe the operating principle mentioned above in more detail. The following example utilizes at least 80 Kenmos 99235 LEDs for each of the three fundamental colors. When the chroma XY value is inputted as (0.33,0.33), the red light brightness, the green light brightness, and the blue light brightness is obtained through the chromatics formula. Then, the ratio of the red light brightness to the green light brightness is obtained as 0.386605, and the ratio of the blue light brightness to the green light brightness is obtained as 0.074277, and the inputted reference value is obtained. Or, by inputting reference value of the color temperature 5600K, the chroma XY value is determined as approximately (0.33,0.33) by the Planckian locus black body radiation curve. Then, after transformation and calculation through the chromatics formula, the ratio of red light brightness to green light brightness is obtained as 0.386605, and the ratio of the blue light brightness to the green light brightness is obtained as 0.074277, whereby the input reference value is also obtained. A white light input value of 2000 lumens serves as the brightness reference value. The reference value generating device 16 generates the brightness reference value of the white light, and the reference values of the red light, the green light, and the blue light according to the brightness value and the color coordinates value transmitted by the input interface 18. If the initial chroma XY values is (0.268,0.313) at the initiation of the red LED 12a, the green LED 12b, and the blue LED 12c, the initial ratio of the red light brightness to the green light brightness is 0.254495, and the initial ratio of the blue light brightness to the green light brightness is 0.099976. The initial currents are 52 mA, 157 mA, and 319 mA, respectively. At this time, the brightness and temperature are 3094.6 lumens and 44° C., respectively. The red light, the green light, the blue light, and the white light signals detected by the 12-bit red light sensing unit 14a, green light sensing unit 14b, blue light sensing unit 14c, and white light sensing unit 14d are 834, 2520, 5122, and 49686, respectively, wherein the light is outputted by the red LED 12a, the green LED 12b, and the blue LED 12c. The red light, green light, blue light, and white light signals after being inputted into the amplifier 20 and then converted to 8-bit signals, are 834, 2520, 5122, and 49686, respectively. The amplifier 20 amplifies the signals and outputs them to the chroma comparison device 22 and the brightness comparison device 24. The chroma comparison device 22 compares the light signals amplified by the amplifier 20 of the ratios of the red light brightness to the green light brightness and the blue light brightness to the green light brightness with the reference value generated by the reference generating device 16. When the comparison result is different from the reference value, the control device 28 uses the PID control method to calculate and adjust to approach the reference value, then outputs the gain ratio of the red light brightness to the green light brightness and the gain ratio of the blue light brightness to the green light brightness as 1.5197 and 0.7432, respectively. The brightness comparison device 24 compares the amplified white light signal from the amplifier 20 with the reference value generated by the reference generating device 16. When the comparison result is different from the reference value, the control device 28 uses the PID control method to calculate and adjust to approach the reference value, and outputs the red light, green light, and blue light brightness gain as 0.646. Please refer to FIG. 3, which is a diagram of brightness calibration, current calibration, and color temperature change after the first time inputting the reference value in the LED control system 10 according to an embodiment of the present invention. The control device 28 calibrates the currents generated for driving the red LED 12a, the green LED 12b, and the blue LED 12c by the driver circuit 26 to 31.4 mA, 94.8 mA, and 192.6 mA, respectively, according to the adjustment result of the chroma comparison device 22 and the brightness comparison device 24. The calibrated drive currents are respectively outputted to the red LED 12a, the green LED 12b, and the blue LED 12c, and the chroma XY values of the red light, green light, and blue light accordingly obtained become (0.3301,0.3301). The ratio of red light brightness to green light brightness is then 0.38676, and the ratio of blue light brightness to green light brightness is 0.074307. After a time T1, the detected brightness and temperature are 1999.1 lumens and 5600K, as shown in FIG. 4, thus achieving the goal of chroma calibration.

In addition to the above, the goal of calibration is also achieved by inputting a second group of reference values, or multiple groups of reference values, after the input of a group of reference brightnesses, color temperatures, or chroma values. For example, if the second group comprises the color temperature 4300K or the chroma XY value (0.37,0.37), after the use of the above-described transformation, the ratio of red light brightness to green light brightness is obtained as 0.457923, and the ratio of blue light brightness to green light brightness becomes 0.049947. These ratios are used as the chroma reference values, and the brightness value of 1500 lumens inputted is set as the brightness reference value. The reference generating device 16 generates the reference value according to the input value mentioned above, and transmits it to the chroma comparison device 22 and the brightness comparison device 24. At this time, the red light, green light, blue light, and white light signals detected by the 12-bit red light sensing unit 14a, green light sensing unit 14b, blue light sensing unit 14c, and white light sensing unit 14d, are 321, 1109, 2253, and 818, respectively. The signals inputted to the amplifier 20 are converted to 8-bit red light, green light, blue light, and white light signals, which are 503, 1522, 3092, and 32078, respectively. The amplifier 20 amplifies and outputs the signals to the chroma comparison device 22 and the brightness comparison device 24. The chroma comparison device 22 compares the light signals amplified by the amplifier 20 of the ratios of the red light brightness to the green light brightness and the blue light brightness to the green light brightness with the reference value generated by the reference generating device 16. When the comparison result is different from the reference value, the control device 28 uses the PID control method to calculate and adjust to approach the reference value, then outputs the gain ratio of the red light brightness to the green light brightness and the gain ratio of the blue light brightness to the green light brightness as 1.1845 and 0.6724, respectively. The brightness comparison device 24 compares the amplified white light signal from the amplifier 20 with the reference value generated by the reference generating device 16. When the comparison result is different from the reference value, the control device 28 uses the PID control method to calculate and adjust to approach the reference value, and outputs the red light, green light, and blue light brightness gain as 0.7504. Please refer to FIG. 4, which is a diagram of brightness calibration, current calibration, and color temperature change after a second time inputting the reference value in the LED control system 10 according to an embodiment of the present invention. According to the adjustment result of the chroma comparison device 22 and the brightness comparison device 24, the control device 28 calibrates the drive currents that the driver circuit 26 utilizes to drive the red LED 12a, the green LED 12b, and the blue LED 12c to 21.6 mA, 63.6 mA, and 129.2 mA, respectively. As shown in FIG. 4, the calibrated drive currents are respectively outputted to the red LED 12a, the green LED 12b, and the blue LED 12c, which output target red light, green light, and blue light having chroma XY value (0.3701, 0.3701). The ratio of red light brightness to green light brightness is then 0.458106, and the ratio of blue light brightness to green light brightness is then 0.049967. The brightness and temperature measured after a time T2 are 1500.1 lumens and 5600K, respectively, which achieves the goal of calibration.

Note that the present invention is not limited to the three fundamental colors of light used in above embodiments, namely red light, green light, and blue light, but could also use four colors, such as red light, green light, blue light, and violet light. The control principle is similar to the principal described above, and their detailed description will not be repeated. Also, regarding chroma control and brightness control, the chroma control does not necessarily need to adjust the brightness gain (GI) of the red light, green light, and blue light simultaneously. The brightness output of one type of light could be adjusted first, and then the chroma control could be used to match the ratios of the other two types of light to the first type of light with the chroma reference value.

Figure 5:
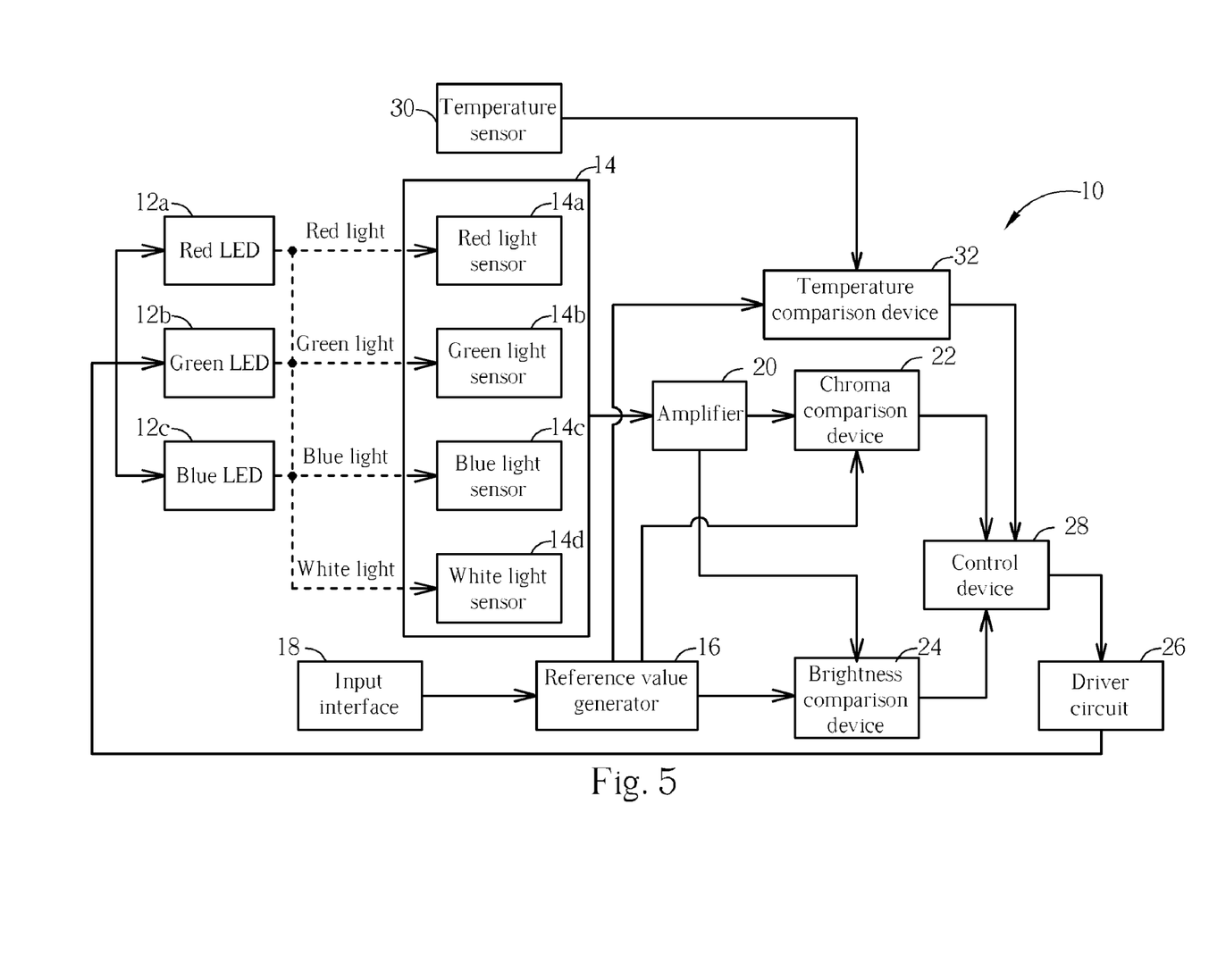
FIG. 5 is a function block diagram of an LED control system having a temperature sensing function according to an embodiment of the present invention.

Please refer to FIG. 5, which is a function block diagram of the LED control system 10 having a temperature sensing function according to an embodiment of the present invention. Because an increase in the internal temperature of the backlight module affects LED effectiveness, the LED control system 10 can further comprise a temperature sensor 30 and a temperature comparison device 32. The temperature sensor 30 is disposed in the backlight module, and is used for sensing the temperature of the backlight module to generate a sensed temperature value. Practically speaking, the temperature sensor is used for sensing the temperature of the plurality of monochromatic light beams outputted by the plurality of LEDs. The temperature comparison device 32 is coupled to the temperature sensor 30, the reference generating device 16, and the control device 28, and is used for comparing a temperature reference value generated by the reference generating device 16 and the sensed temperature value sent from the temperature sensor 30. The user also uses the input interface 18 to input the temperature reference value. The control device 28 is then used for controlling the current or voltage generated by the driver circuit 26 to drive the red LED 12a, the green LED 12b, and the blue LED 12c according to the comparison result of the temperature comparison device 32.

Compared to the conventional method and LED control system for calibrating the plurality of monochromatic light beams outputted by the plurality of LEDs, an embodiment of the present invention not only uses the respective signals of the plurality of monochromatic light beams sensed to perform a closed-loop control for chroma, but also uses the brightness of the light source formed by the combination of the plurality of monochromatic light to perform closed-loop control for brightness. Another embodiment of the present invention further uses the temperature value sensed to perform a closed-loop control for the LED brightness. In this way, the present invention improves on the prior art shortcoming that the respective sensed signals of the three color lights is used as a feedback signal, and the brightness value outputted by the light source of the backlight module is purely calculated by combining the respective brightness values of the three color lights. The present invention directly performs feedback control on the brightness of the light source, and truly improves the problem of LED light source instability.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method of calibrating a plurality of monochromatic light beams outputted by a plurality of light emitting diodes comprising steps of:
   providing a plurality of reference values of the plurality of monochromatic light beams;
   providing a brightness reference value of a light formed of the plurality of monochromatic light beams;
   sensing a plurality of first light signals of the plurality of monochromatic light beams outputted by the plurality of light emitting diodes;
   sensing a second light signal of the light formed of the plurality of monochromatic light beams;
   comparing the plurality of the first light signals of the plurality of monochromatic light beams with the plurality of the reference values of the plurality of monochromatic light beams;
   comparing the second light signal of the light formed of the plurality of monochromatic light beams with the brightness reference value of the light formed of the plurality of monochromatic light beams; and
   calibrating the plurality of monochromatic light beams outputted by the plurality of light emitting diodes according to a result of comparing the plurality of first light signals with the plurality of reference values and a result of comparing the second light signal with the brightness reference value.

2. The method of claim 1, wherein providing the plurality of reference values of the plurality of monochromatic light beams comprises providing a color coordinates for generating the reference values of the plurality of monochromatic light beams.

3. The method of claim 1, wherein providing the plurality of reference values of the plurality of monochromatic light beams comprises providing a color temperature for generating the reference value of the plurality of monochromatic light beams.

4. The method of claim 1, wherein providing the plurality of reference values of the plurality of monochromatic light beams comprises providing a ratio of a red light brightness and a green light brightness and a ratio of a blue light brightness and the green light brightness as the reference values of the plurality of monochromatic light beams, and providing the brightness reference value of the light formed of the plurality of monochromatic light beams comprises providing a white light brightness reference value.

5. The method of claim 1, wherein sensing the plurality of first light signals of the plurality of monochromatic light outputted by the plurality of light emitting diodes comprises sensing the brightness of the plurality of the first light signals of the plurality of monochromatic light beams outputted by the plurality of light emitting diodes, the plurality of monochromatic light beams being red light, green light, and blue light, and sensing the second light signal of the light formed of the plurality of monochromatic light beams comprising sensing a brightness of the light formed of the red light, the green light, and the blue light and the light being white.

6. The method of claim 1 further comprising amplifying the first light signals of the plurality of monochromatic light beams detected, and amplifying the second light signal of the light formed of the plurality of monochromatic light beams sensed.

7. The method of claim 1, wherein calibrating the plurality of monochromatic light beams outputted by the plurality of light emitting diodes according to the result of comparing the plurality of first light signals with the plurality of reference values and the result of comparing the second light signal with the brightness reference value comprises calibrating a current or voltage for driving the plurality of light emitting diodes according to a result of comparing the plurality of first light signals with the plurality of reference values and a result of comparing the second light signal with the brightness reference value.

8. An light emitting diode control system for calibrating a plurality of monochromatic light beams outputted by a plurality of light emitting diodes comprising:
   a reference value generating device for generating reference values of the plurality of monochromatic light beams and a brightness reference value of a light formed of the plurality of monochromatic light beams;
   a light sensing module for sensing first light signals of the plurality of monochromatic light beams outputted by the plurality of light emitting diodes, and for sensing a second light signal of the light formed of the plurality of monochromatic light beams;
   a chroma comparison device coupled to the reference value generating device and the light sensing module for comparing the reference values of the plurality of monochromatic light beams generated by the reference value generating device and the first light signals of the plurality of monochromatic light beams sensed by the light sensing module;
   a brightness comparison device coupled to the reference value generating device and the light sensing module for comparing the brightness reference value of the light formed of the plurality of monochromatic light beams generated by the reference value generating device and the second light signal of the light formed of the plurality of monochromatic light beams sensed by the light sensing module; and
   a control device coupled to the chroma comparison device and the brightness comparison device for calibrating the plurality of monochromatic light beams outputted by the plurality of light emitting diodes according to a comparison result outputted by the chroma comparison device and a comparison result outputted by the brightness comparison device.

9. The light emitting diode control system of claim 8 further comprising an input interface coupled to the reference value generating device for inputting a brightness value or color coordinates.

10. The light emitting diode control system of claim 9, wherein the reference value generating device is used for generating the brightness reference value of the light formed of the plurality of monochromatic light beams according to the brightness value inputted from the input interface.

11. The light emitting diode control system of claim 9, wherein the reference value generating device is used for generating a ratio of a red light brightness to a green light brightness and a ratio of a blue light brightness to the green light brightness according to the color coordinates transmitted by the input interface.

12. The light emitting diode control system of claim 8, wherein the light sensing module comprises:
   a red light sensing unit for sensing a brightness of red light outputted by the plurality of light emitting diodes;
   a green light sensing unit for sensing a brightness of green light outputted by the plurality of light emitting diodes;
   a blue light sensing unit for sensing a brightness of blue light outputted by the plurality of light emitting diodes; and
   a white light sensing unit for sensing a brightness of the white light formed of the red light, the green light, and the blue light.

13. The light emitting diode control system of claim 8 further comprising an amplifier coupled to the light sensing module for amplifying the first light signals of the plurality of monochromatic light beams outputted by the plurality of light emitting diodes and the second light signal of the light formed of the plurality of monochromatic light beams sensed by the light sensing module.

14. The light emitting diode control system of claim 8 further comprising a driver circuit coupled to the plurality of light emitting diodes and the control device for driving the plurality of light emitting diodes to output the plurality of monochromatic light beams, wherein the control device is used for controlling the driver circuit to drive a current or a voltage of the plurality of light emitting diodes according to comparison results of the chroma comparison device and the brightness comparison device.

15. The light emitting diode control system of claim 8, wherein the plurality of light emitting diodes comprises a red light emitting diode, a green light emitting diode, and a blue light emitting diode.

16. The light emitting diode control system of claim 8 further comprising:
- a temperature sensor for sensing temperatures of the plurality of monochromatic light beams outputted by the plurality of light emitting diodes and producing a sensed temperature value; and
- a temperature comparison device coupled to the temperature sensor, the reference value generating device, and the control device for comparing a temperature reference value generated by the reference value generating device with the sensed temperature value;

wherein the control device is used for calibrating the plurality of monochromatic light beams outputted by the plurality of light emitting diodes according to a comparison result of the temperature comparison device.

* * * * *